Jan. 9, 1934.  A. V. MOTSINGER  1,942,442
GAS MASK HEAD HARNESS
Filed Dec. 21, 1931

INVENTOR.
A. V. Motsinger
BY
Millard F. Peake, Jr.
ATTORNEY.

Patented Jan. 9, 1934

1,942,442

UNITED STATES PATENT OFFICE 1,942,442

GAS MASK HEAD HARNESS

Armand V. Motsinger, Otter Point, Md.

Application December 21, 1931
Serial No. 582,345

5 Claims. (Cl. 128—140)

REISSUED (Granted under the act of March 3, 1883, as
amended April 30, 1928; 370 O. G. 757)

This invention described herein may be manufactured and used by or for the Government for government purposes, without the payment to me of any royalty thereon.

This invention relates in general to gas masks and more particularly has reference to a harness for holding the facepiece of a gas mask against the face.

The facepiece usually is made of rubber and has a number of buckles around the edge, an equal number on each side of the face, for holding the facepiece and making a gas tight seal between the facepiece and face. Previously the harness has been made by attaching rubber elastic webbing to a head pad; the elastic webbing being threaded through buckles on the facepiece for adjustment and attached to the head pad resting on the back of the head. There have also been made moulded rubber harnesses having the head straps and head pad moulded integral. The purpose of the resilient head straps was for comfort and for allowing the harness to slip over the head. The rubber in the head harnesses previously used has deteriorated rapidly, lost its resiliency and become useless after a short length of time. The design utilizing rubber or rubber elastic webbing was not adaptable for the use of a coil steel spring, as the resulting harness would be cumbersome and expensive to manufacture.

An object of this invention is to provide a head harness where resilient head straps might be made of a coil steel spring or springs.

Another object of this invention is to provide a head harness having a head pad to hold a resilient member and prevent it from twisting.

Still another object of this invention is to provide a head harness having a spring member doubled back on itself so as to utilize the loops so formed to hold the spring to a head pad and to buckle straps.

A further object of this invention is to provide a head harness so designed that only one resilient member is required for the several head straps.

A further object of the invention is to provide a head harness having a long life that is comfortable to wear, adaptable to manufacture in quantities and that is comparatively inexpensive to manufacture.

With these and other objects in view which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawing means for carrying the same into practical effect, without limiting the improvements in their useful applications to the particular constructions which for the purpose of explanation have been made the subject of illustration.

In the drawing forming a part of this specification:

Figure 1:
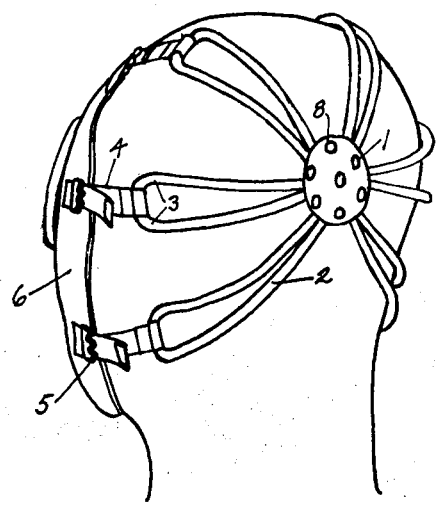
Figure 1 is a rear-side view of a man's head and shows the head harness as applied to holding a facepiece to the face.

Referring by numerals to the drawing, in which the same and similar elements are designated by like symbols of reference throughout, and more particularly in Figure 1, there is shown a head pad 1, a single tension spring member 2 looped in and out around the pad and formed into looped portions 3 extending from the pad and non-elastic tabs 4 attached to the extended looped portions of the spring. These non-elastic tabs are adapted to be secured to buckles 5 on a facepiece 6 and thus make the harness adjustable and also detachable from the facepiece.

Figure 3:
Figure 3 is a sectional view taken on line 3—3 of Figure 2.
Figure 2:
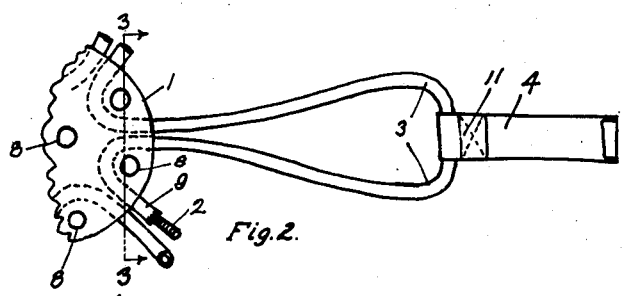
Figure 2 is a detail drawing of the harness and shows a section of the head pad and one head strap.

Figures 2 and 3 show a more detailed view of a section of the head pad 1 and one looped portion 3. The inwardly extending loops of the spring 2 covered by the sleeving 9 extend between the two plies 7 of the head pad and are secured by rivets 8 which draw the two plies tightly together over the spring member. The resilient member 2 is covered by a tubular cloth covering 9 similar to the cotton tubing commonly used for electrical purposes. The tubular covering is so woven with the threads diagonal to its length that it contracts with the spring and thus does not wrinkle as much as straight woven cloth.

The purpose of the covering is to prevent the hair from being caught between the coils and also to prevent the spring from being over-stretched.

Figure 4:
Figure 4 is a detail view of the resilient member showing the method of securing together the two ends of same by means of a section of metal tubing.

In Figure 4 is shown a method of securing the two ends of the resilient member 2. A section of metal tubing 10 may be crimped over the two ends of the spring and covering to secure same and thus make an endless pull spring covered by tubular cotton sleeving. The endless resilient member so formed is then looped in and out the inner loops being secured to a head pad and the outer loops having non-elastic straps 4 for attachment to the gas mask buckles. The non-elastic straps 4 are secured to the outer loops of the spring member by turning the end of the strap around the spring member and back on itself where the end is secured to the body of the strap by stitching 11.

Figure 6:
Figure 6 is a sectional view taken on the line 6—6 of Figure 5.
Figure 5:
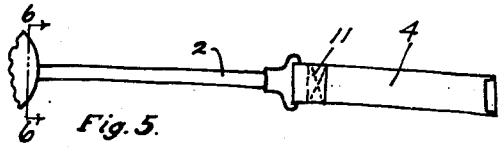
Figure 5 is a detail view of a modification of the single resilient member harness showing a sectional view of a head pad and one harness strap.

Figures 5 and 6 show a modification of the invention where the tension spring member 2 is made in separate sections, one for each head strap. Referring to Figures 2 and 5 it is apparent that the head pad 1 may be made of pressed metal or a moulded material such as a phenolic condensation product.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A head harness comprising a head pad adapted to be positioned against the back of a wearer's head, said pad being formed of two members, a continuous coiled spring having spaced portions thereof looped between the two members of said head pad, and means securing said two members together and also preventing slippage of said coiled spring.

2. In combination, a device to be resiliently retained against the face of a wearer, a head harness comprising a head pad adapted to be positioned against the back of a wearer's head, a coiled spring formed into a plurality of loops radiating outwardly from said head pad, means securing said loops to said head pad to prevent slippage of said spring, tabs on said radiating loops, and detachable members connecting said tabs to the device.

3. In combination, a gas mask, a head pad formed of two members and adapted to be positioned against the back of the wearer's head, a continuous coiled spring formed into a plurality of loops radiating outwardly from said head pad, means for securing the two members of said head pad together and binding said loops between said members against slippage, tabs on said radiating loops, and detachable members connecting said tabs to spaced portions of said gas mask.

4. Head harness for resiliently securing a device against the face of a wearer comprising a head pad having two complemental members, a continuous one-piece resilient member having spaced portions thereof looped between the two complemental head pad members, and means securing said complemental head pad members together and binding the portions of the resilient member therebetween against movement.

5. In combination, a device to be resiliently retained against the face of a wearer, a head harness including a head pad adapted to be positioned against the back of a wearer's head, a coiled spring formed into a plurality of closed loops radiating outwardly from said head pad, means securing said loops to said head pad to prevent slippage of said spring, a fabric sleeve covering said spring to expand and contract therewith without wrinkling, and means connecting the outer portions of said loops with said device.

ARMAND V. MOTSINGER.